US008875269B2

(12) United States Patent
Austel et al.

(10) Patent No.: US 8,875,269 B2
(45) Date of Patent: Oct. 28, 2014

(54) USER INITIATED AND CONTROLLED IDENTITY FEDERATION ESTABLISHMENT AND REVOCATION MECHANISM

(75) Inventors: Paula K. Austel, Cortland Manor, NY (US); He Yuan Huang, Beijing (CN); Michael McIntosh, Clifton Park, NJ (US); Bin Wang, Beijing (CN); Jing Min Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 13/033,029

(22) Filed: Feb. 23, 2011

(65) Prior Publication Data

US 2012/0216267 A1   Aug. 23, 2012

(51) Int. Cl.
*G06F 7/04* (2006.01)
*G06F 15/16* (2006.01)
*G06F 17/30* (2006.01)
*H04L 29/06* (2006.01)
*H04L 29/08* (2006.01)
*H04L 9/32* (2006.01)

(52) U.S. Cl.
CPC ............. *H04L 9/3234* (2013.01); *H04L 9/3231* (2013.01); *H04L 67/2814* (2013.01); *H04L 63/0815* (2013.01); *H04L 63/0869* (2013.01); *H04L 63/08* (2013.01); *H04L 63/0823* (2013.01); *H04L 9/32* (2013.01); *H04L 63/06* (2013.01)
USPC ................. 726/8; 713/67; 713/156; 713/158; 726/6; 726/27; 380/45

(58) Field of Classification Search
CPC ...... H04L 63/06; H04L 63/08; H04L 63/0815; H04L 63/0823; H04L 63/0869; H04L 9/32; H04L 9/3213
USPC .......... 713/156, 158, 67; 380/45; 726/6, 8, 27
See application file for complete search history.

(56) References Cited

U.S. PATENT DOCUMENTS

| 7,137,006 | B1 * | 11/2006 | Grandcolas et al. | 713/180 |
| 7,536,722 | B1 * | 5/2009 | Saltz et al. | 726/20 |
| 8,146,141 | B1 * | 3/2012 | Grandcolas et al. | 726/5 |
| 8,364,970 | B2 * | 1/2013 | Fu | 713/185 |
| 2006/0018483 | A1 * | 1/2006 | Das | 380/277 |
| 2006/0274695 | A1 * | 12/2006 | Krishnamurthi et al. | 370/331 |
| 2007/0208936 | A1 * | 9/2007 | Ramos Robles | 713/168 |

(Continued)

OTHER PUBLICATIONS

International Search Report Dated May 25, 2012.

*Primary Examiner* — Jeffrey Pwu
*Assistant Examiner* — Jayesh Jhaveri
(74) *Attorney, Agent, or Firm* — F. Chau & Associates, LLC; Preston J. Young, Esq.

(57) ABSTRACT

A method for single sign-on with established federation includes triggering a single sign-on operation from a first service to a second service, retrieving, by the first service, an associated federation key and pseudo identification for a user agent, generating, by the first service, a token signed with a federation key for the user agent based on the pseudo identification, redirecting, by the first service, the user agent to the second service, wherein the user agent transfers the token to the second service, verifying, by the second service, the token and determining an associated identification in the second service, and returning, by the second service, a resource to the user agent.

17 Claims, 4 Drawing Sheets

(56) References Cited

U.S. PATENT DOCUMENTS

| | | |
|---|---|---|
| 2008/0168539 A1* | 7/2008 | Stein .................................. 726/5 |
| 2008/0288999 A1* | 11/2008 | Satoh et al. ........................ 726/1 |
| 2008/0320576 A1* | 12/2008 | Curling ............................ 726/8 |
| 2009/0119763 A1* | 5/2009 | Park et al. ......................... 726/8 |
| 2009/0205032 A1* | 8/2009 | Hinton et al. ..................... 726/7 |
| 2009/0276840 A1* | 11/2009 | Cao et al. .......................... 726/9 |
| 2010/0077469 A1* | 3/2010 | Furman et al. .................... 726/8 |
| 2011/0055910 A1* | 3/2011 | Attanasio et al. ................. 726/6 |
| 2011/0138453 A1* | 6/2011 | Verma et al. ...................... 726/8 |
| 2011/0154465 A1* | 6/2011 | Kuzin et al. ...................... 726/9 |
| 2011/0196944 A1* | 8/2011 | Seno ............................. 709/219 |
| 2011/0209202 A1* | 8/2011 | Otranen ............................ 726/4 |
| 2012/0054120 A1* | 3/2012 | Hjelm et al. ................... 705/347 |
| 2012/0096534 A1* | 4/2012 | Boulos et al. .................... 726/8 |
| 2012/0109926 A1* | 5/2012 | Novik et al. .................. 707/707 |
| 2012/0185391 A1* | 7/2012 | Sirota ............................. 705/44 |

* cited by examiner

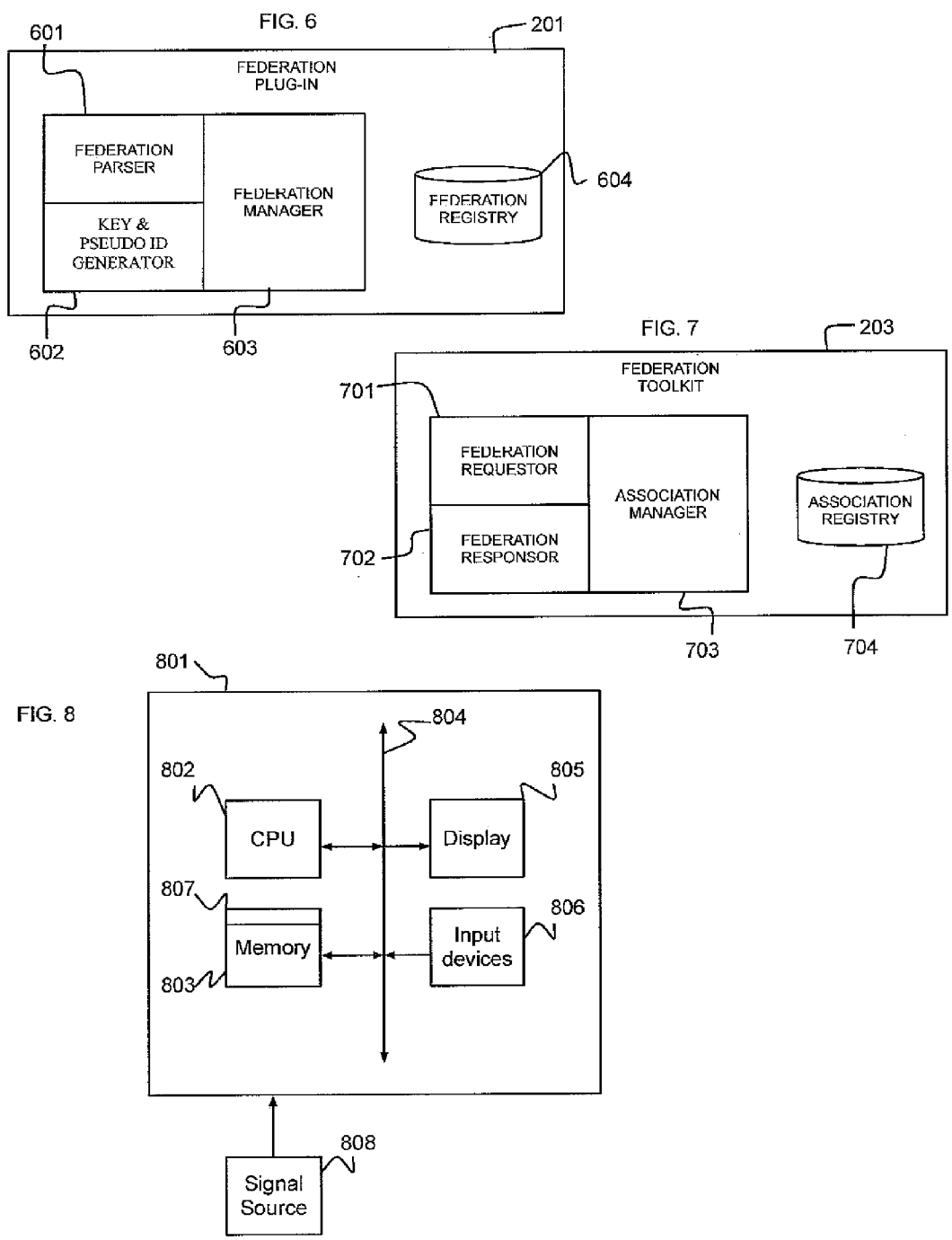

USER INITIATED AND CONTROLLED IDENTITY FEDERATION ESTABLISHMENT AND REVOCATION MECHANISM

BACKGROUND

1. Technical Field

The present disclosure generally relates to supporting multiple concurrent jobs, and more particularly to a flexible allocation scheme for data parallel tasks.

2. Discussion of Related Art

Identity federation is a process enabling users of one domain to securely access data or systems of another domain seamlessly and without the need for completely redundant user administration. Identity federation enables cross-domain single sign-on and secure data access. Having a business agreement between the involved parties is an important prerequisite for identity federation.

The requirement of business agreements hinders identity federation in environments where parties or participants may have no pre-existing relationship or where relationships are numerous and fast changing. One example of such an environment is Software as a Service (SaaS). In SaaS, providers are not able to readily engage in the number and kinds of business agreements that would enable the implementation of identity federation.

According to an embodiment of the present disclosure, a need exists for identity federation in a SaaS environment.

BRIEF SUMMARY

According to an embodiment of the present disclosure, a method for single sign-on with established federation includes triggering a single sign-on operation from a first service to a second service, retrieving, by the first service, an associated federation key and pseudo identification for a user agent, generating, by the first service, a token signed with a federation key for the user agent based on the pseudo identification, redirecting, by the first service, the user agent to the second service, wherein the user agent transfers the token to the second service, verifying, by the second service, the token and determining an associated identification in the second service, and returning, by the second service, a resource to the user agent.

According to an embodiment of the present disclosure, an identity federation method including redirecting a user agent, logged into a first service, to a second service, wherein the first service communicates to the user agent a federation request signed by the first service, wherein the user agent is not logged into the second service, authenticating the user agent with the second service, communicating the federation request signed by the first service to the second service, signing the federation request by the second service, capturing the federation request signed by the first and second services, verifying the signatures of the first and second services, creating a mapping in identification information stored by the user agent between the first and second services, generating a federation key and a pseudo-identification for federation among the first and second service, and communicating the federation key and the pseudo-identification to the first and second services supporting single sign on functionality.

According to an embodiment of the present disclosure, a method for revoking identity federation including communicating a federation key to a first and second service with a revocation request, and removing federation information of a user agent stored by the first and second services corresponding to the federation key.

BRIEF DESCRIPTION OF THE SEVERAL VIEWS OF THE DRAWINGS

Preferred embodiments of the present disclosure will be described below in more detail, with reference to the accompanying drawings:

FIG. 6 is a diagram of a federation plug-in from FIG. 1;

FIG. 7 is a diagram of a federation toolkit from FIG. 1; and

FIG. 8 is a computer system for implementing a method according to an embodiment of the present disclosure.

DETAILED DESCRIPTION

According to an embodiment of the present disclosure, identity federation may be employed as a single-sign on access mechanism for a Software as a Service (SaaS) environment having multiple service providers.

Figure 1:
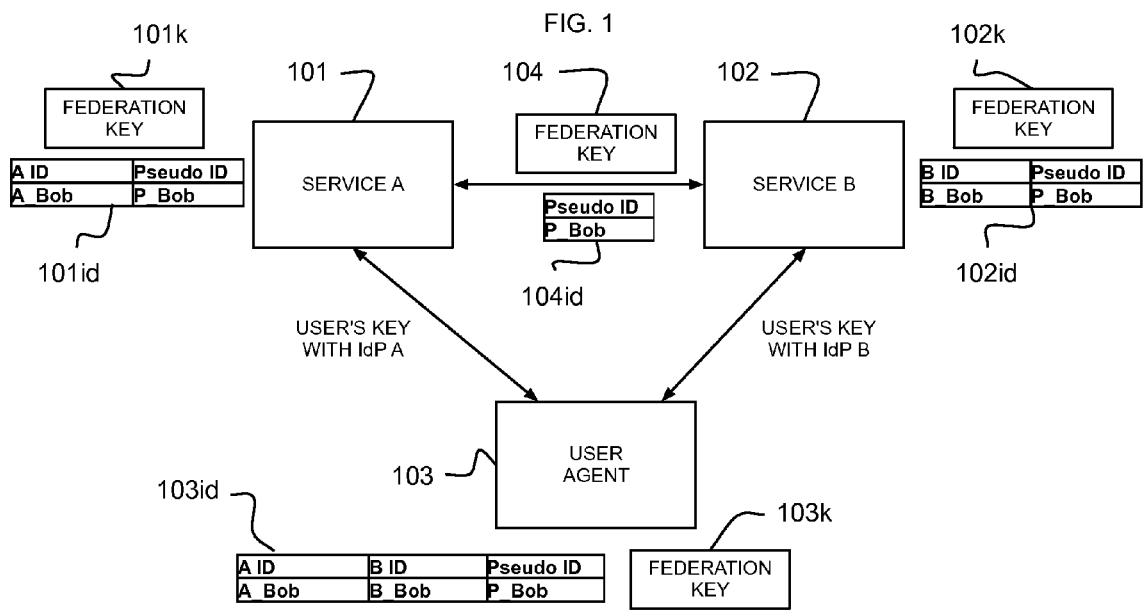
FIG. 1 is a diagram of a user-centric identity federation system according to an embodiment of the present disclosure.

Embodiments of the present disclosure will be discussed in the context of an environment comprising two independent SaaS services, service A and service B. Referring to FIG. 1, service A 101 and service B 102 act as service providers and have respective identity providers. In FIG. 1, a user 103 has subscribed services from both service A 101 and service B 102. For example, the user 103 has an account with service A 101 and an account with service B 102.

According to an embodiment of the present disclosure, the user 103 may establish a single sign-on (SSO) for both service A 101 and service B 102 without exposing account information in service A 101 to service B 102 or account information in service B 102 to service A 101.

In the exemplary case, it is assumed that there is no pre-existing relationship between service A 101 and service B 102. The user agent 103 is associated with its own federation key 103k and separate federation keys (101k and 102k) stored by service A 101 and service B 102, respectively.

Identification information 101k-103k is stored at each of service A 101, service B 102 and the user agent 103. The user agent 103 stores the login identification information for both service A and B, while the respective services store the login identification information associated with their own service.

If SSO from service A 101 to service B 102 is expected, then service A 101 knows the address of service B 102, and service A 101 will trigger a federation request. If SSO from service B 102 to A 101 is expected, then service B 102 knows the address of service A 101, and service B 102 will trigger the federation request.

According to an embodiment of the present disclosure, a user-specific trust may be established between service A 101 and service B 102 embodied in a federation key 104 between the different service providers and shared identification information associated with the user agent (104id).

According to an embodiment of the present disclosure, a method for user-centric identity federation is described with reference to FIGS. 2 and 3. Communications between the user agent 103 and the services (101-102) may be secure communication channels (e.g., using Secure Sockets Layer (SSL) technology). At block 301, the user agent 103 logs into the first service, e.g., service A 101. Here it may be assumed that the user agent 103 is not logged into the second service, service B 102. The method enables access to service B 102 while in service A 101 by, for example, a user selection of a link to service B 102. More particularly, at block 302, while the user agent 103 is logged into service A 101 and upon the selection of a link to service B, service A 101 communicates with the user agent 103 to redirect the user agent 103 to service B 102 with a signed federation request describing metadata of service A 101. Here, a user agent federation key 101k in service A 101 may be used to sign the request.

At block 303, the user agent 103 communicates with Service B 102 for authentication of the user agent's identity.

At block 304, the service B 102 adds its own metadata to the request and signs the request. The user agent's key in service B 102 may be used to sign the request.

At block 305, a user agent plug-in 201 captures the federation request from service B 102.

At block 306, the user agent plug-in 201 verifies the signatures of services A and B with the user agent's own information and maps the user agent identification information in service A 101id with the user agent identification information in service B 102id, creating a mapping in the identification information 103id stored by the user agent 103 (see FIG. 1).

At block 307, the user agent 103 generates a federation key 103k and a pseudo ID for the federation, which is stored in the identification information 103id. The user agent plug-in 201 communicates the federation key 103k and pseudo identification to services A and B (101 and 102).

Services A and B (101 and 102) respectively associate the user agent's federation information with user agent's pseudo identification information (101id and 102id).

Figure 4:
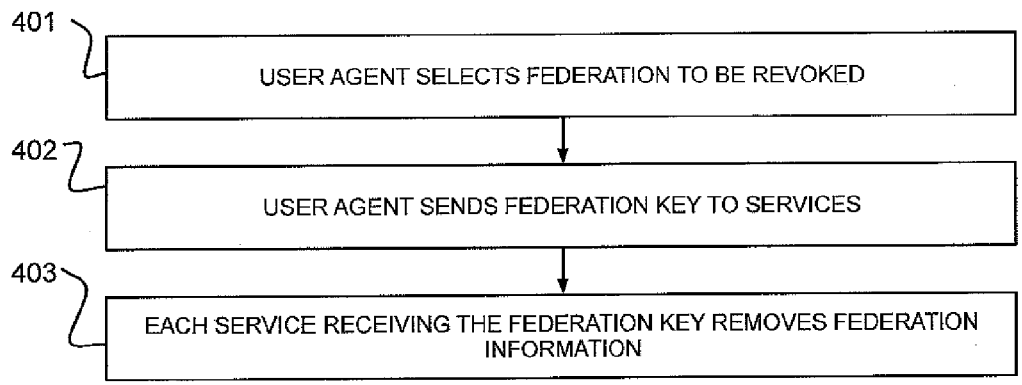
FIG. 4 is flow diagram for a method of revoking a user-centric identity federation according to an embodiment of the present disclosure.

Identity federation may be revoked by the user agent. Here is may be assumed that both service A and service B have a secure communication channel (e.g., SSL) with the user agent, that a federation exists between service A and B for the user agent and that the user agent has logged into service A (and is not logged into service B). Referring to FIGS. 2 and 4, at block 401, the user agent 103 selects the federation to be revoked from the user agent plug-in 201. At block 402, the user agent plug-in 201 sends the federation key (previously generated) to service A and service B. At block 403, service A and service B remove the federation information for the user agent correspondingly. The revocation of federation disables SSO between the services for the user agent. The user agent maintains logon rights with both services.

Figure 2:
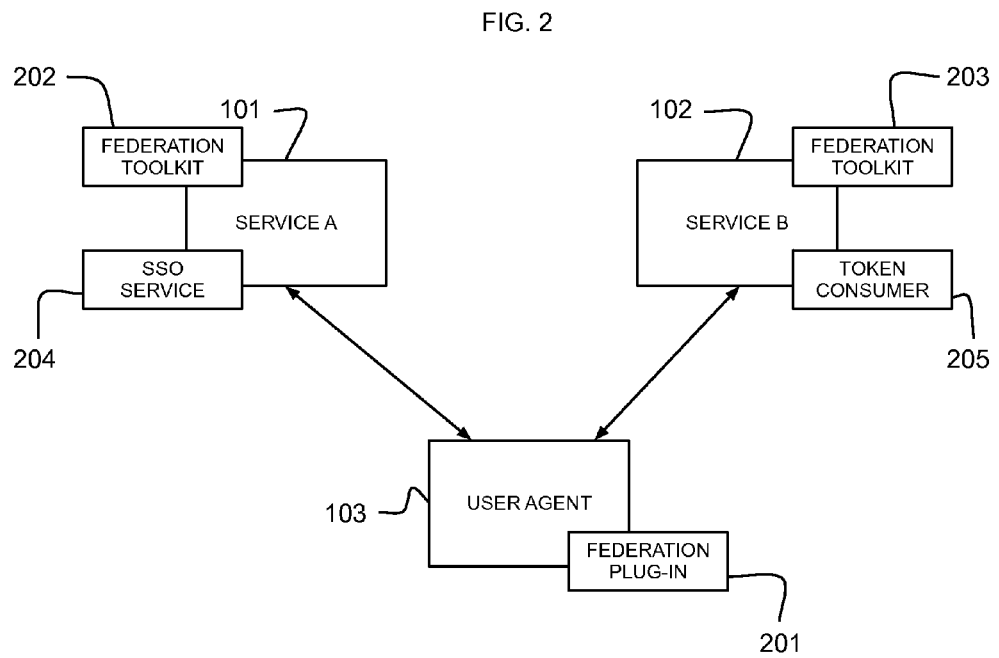
FIG. 2 is a diagram of a user-centric identity federation system according to an embodiment of the present disclosure.
Figure 3:
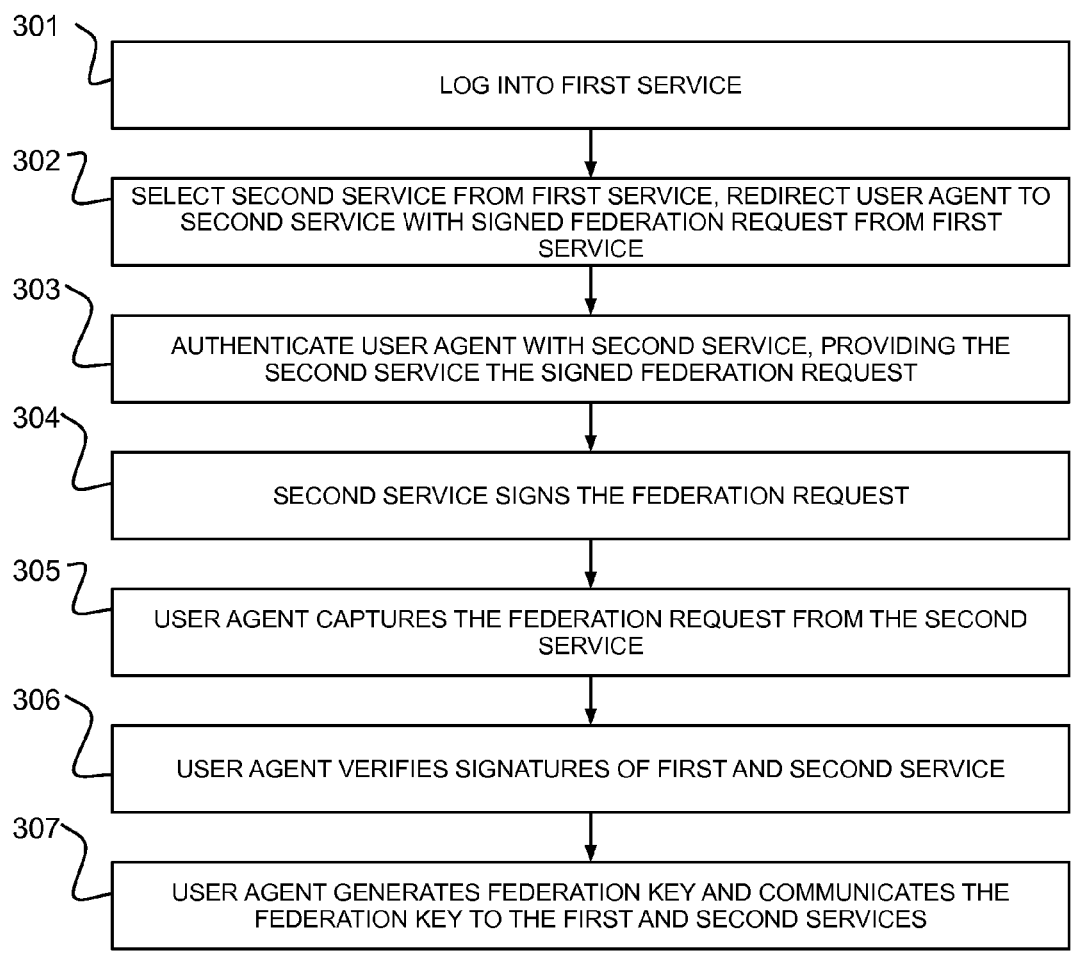
FIG. 3 is flow diagram for a method of establishing a user-centric identity federation according to an embodiment of the present disclosure.
Figure 5:
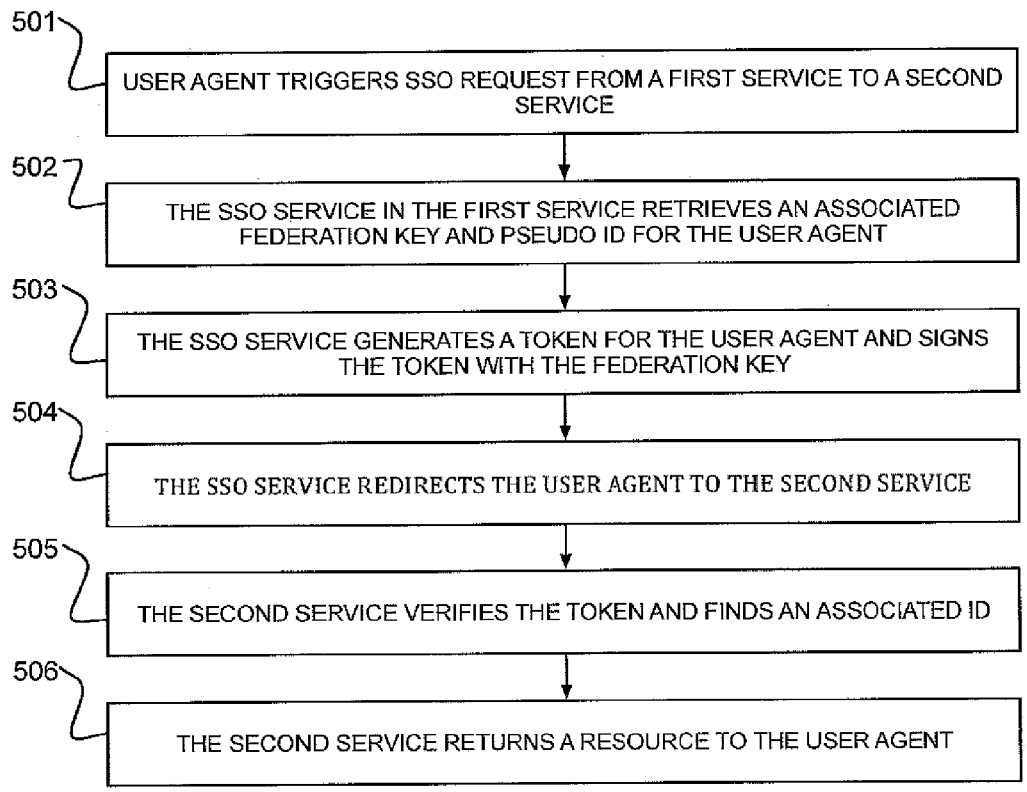
FIG. 5 is flow diagram for a method for SSO in a user-centric identity federation environment according to an embodiment of the present disclosure.

Referring to FIGS. 2 and 5, a method for single sign-on with established federation enables the user agent to access service B from a link at service A. It may be assumed that both service A and service B have a secure communication channel (e.g., SSL) with the user agent, and that a federation exists between service A and service B for the user agent. Further, it may be assumed that service A 101 has deployed an SSO service 204 to redirect the user agent to service B 102 with an authentication assertion token and that service B 102 has deployed a token consumer 205 to verify the token received from service A 101. In a case where the user agent 103 has logged in service A 101 (and is not logged into service B), the user agent 103 selects a link to service B 102, triggering an SSO from service A to B (see block 501) via the user agent, which navigates from service A to service B, transferring the token generated by service A to service B. At block 502, the SSO service 204 in service A 101 retrieves an associated federation key and pseudo id for the user agent 103. At block 503, the SSO service 204 generates a token for the user agent based on the pseudo id and signs the token with the federation key. At block 504, the SSO service 601 redirects the user agent to service B 102. At block 505, a token consumer 205 in service B 102 verifies the token and finds an associated id in service B 102. At block 506, service B 102 returns a resource to the user agent 103 in terms of the user agent id in service B.

Referring to FIG. 6, the user agent federation plug-in 201 comprises a federation parser 601 to parse the federation info embedded in a federation consent page displayed to user agent, a key and pseudo id generator 602 to generate the federation key and pseudo id for a federation relationship, and a federation manager 603 to provide a user management console for establishing/revocation/query operations on the federation relationships. The federation key and pseudo id may be stored in a federation registry 604.

The service federation toolkits 203 each include a federation requestor 701 to initiate a federation request and a federation responsor 702 to accept federation requests, prompt a federation consent page displayed to the user agent and accept approved federation/revocation of federation from the federation plug-in of the user agent. The service federation toolkits further includes an association manager 703 for performing add/remove/query operations on the association among an identifier, pseudo identifier, federation key, and target service provider. Association information, e.g., identifier, pseudo identifier, federation key, and target service provider information, may be stored in an association registry 704.

The methodologies of embodiments of the disclosure may be particularly well-suited for use in an electronic device or alternative system. Accordingly, implementations the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Referring to FIG. 8, according to an embodiment of the present disclosure, a computer system 801 for implementing user-centric identity federation can comprise, inter alia, a process 802 (e.g., central processing unit (CPU)), a memory 803 and an input/output (I/O) interface 804. The computer system 801 is generally coupled through the I/O interface 804 to a display 805 and various input devices 806 such as a mouse and keyboard. The support circuits can include circuits such as cache, power supplies, clock circuits, and a communications bus. The memory 803 can include random access memory (RAM), read only memory (ROM), disk drive, tape drive, etc., or a combination thereof. Embodiments of the present disclosure can be implemented as a routine 807 that is stored in memory 803 and executed by the processor 802 to process the signal from the signal source 808. As such, the computer system 801 is a general-purpose computer system that becomes a specific purpose computer system when executing the routine 807.

The computer platform 801 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the present disclosure is not limited to those precise embodiments, and that various other changes and modifications may be made therein by one skilled in the art without departing from the scope of the appended claims.

What is claimed is:

1. A method for single sign-on with established federation comprising:
    triggering a single sign-on operation from a first service to a second service;
    retrieving, by the first service, an associated federation key and pseudo identification for a user agent;
    generating, by the first service, a token signed with a federation key for the user agent based on the pseudo identification;
    transferring the token from the user agent to the second service under the direction of the first service;
    verifying, by the second service, the token and determining an associated identification in the second service; and
    returning, by the second service, a resource to the user agent,
    wherein the first service and the second service store a respective first and second federation key associated with the user agent, the user agent generates a third federation key based on the pseudo identification and signs the token with the third federation key, and the generated third federation key is sent to the first and second service to accomplish the single sign-on operation, wherein the resource is returned to the user agent on the basis of the token without the user agent signing-on to the second service.

2. The method of claim 1, further comprising storing the federation key in a federation registry of the user agent.

3. The method of claim 1, further comprising storing association information in an association registry of at least one of first service and second service.

4. An identity federation method comprising:
   redirecting a user agent, logged into a first service, to a second service, wherein the first service communicates to the user agent a federation request signed by the first service, wherein the user agent is not logged into the second service;
   authenticating the user agent with the second service;
   communicating the federation request signed by the first service to the second service; signing the federation request by the second service;
   capturing the federation request signed by the first and second services;
   verifying the signatures of the first and second services;
   creating a mapping in identification information stored by the user agent between the first and second services;
   generating a federation key and a pseudo-identification for federation among the first and second service; and
   communicating the federation key and the pseudo-identification to the first and second services supporting single sign on functionality carried out by a single sign-on service between the first and second service,
   wherein the first service and the second service store a respective first and second federation key associated with the user agent, the user agent generates a third federation key based on the pseudo-identification for signing a token generated by the single sign-on service for carrying out a single sign on, and the generated third federation key is sent to the first and second service to complete the federation request.

5. The identity federation method of claim 4, further comprising associating the federation key and the pseudo-identification with user information stored by the first and second services.

6. The identity federation method of claim 4, further comprising maintaining an association registry at each of the first and second services, each association registry storing association information.

7. The identity federation method of claim 4, further comprising revoking identity federation.

8. The identity federation method of claim 7, further comprising:
   communicating the federation key to the first and second service with a revocation request; and
   removing federation information of the user agent stored by the first and second services corresponding to the federation key.

9. A computer program product for single sign-on with established federation, the computer program product comprising:
   a non-transitory computer readable storage medium having computer readable program code embodied therewith, the computer readable program code comprising:
   computer readable program code configured to trigger a single sign-on operation from a first service to a second service;
   computer readable program code configured to retrieve, by the first service, a federation key and pseudo identification for a user agent;
   computer readable program code configured to generate, by the first service, a token signed with the federation key for the user agent based on the pseudo identification;
   computer readable program code configured to transfer the token from the user agent to the second service under the direction of the first service;
   computer readable program code configured to verify, by the second service, the token and determining an associated identification in the second service; and
   computer readable program code configured to return, by the second service, a resource to the user agent,
   wherein the first service and the second service store a respective first and second federation key associated with the user agent, the user agent generates a third federation key based on the pseudo identification and signs the token with the third federation key, and the generated third federation key is sent to the first and second service to accomplish the single sign-on operation,
   wherein the resource is returned to the user agent on the basis of the token without the user agent signing-on to the second service.

10. The computer program product of claim 9, further comprising computer readable program code configured to store the federation key in a federation registry of the user agent.

11. The computer program product of claim 9, further comprising computer readable program code configured to store association information in an association registry of at least one of first service and second service.

12. A computer program product for implementing an identity federation method, the computer program product comprising:
   a non-transitory computer readable storage medium having computer readable program code embodied therewith, the computer readable program code comprising:
   computer readable program code configured to redirect a user agent, logged into a first service, to a second service, wherein the first service communicates to the user agent a federation request signed by the first service, wherein the user agent is not logged into the second service;
   computer readable program code configured to authenticate the user agent with the second service;
   computer readable program code configured to communicate the federation request signed by the first service to the second service;
   computer readable program code configured to sign the federation request by the second service;
   computer readable program code configured to capture the federation request signed by the first and second services;
   computer readable program code configured to verify the signatures of the first and second services;
   computer readable program code configured to create a mapping in identification information stored by the user agent between the first and second services;
   computer readable program code configured to generate a federation key and a pseudo-identification for federation among the first and second service; and
   computer readable program code configured to communicate the federation key and the pseudo-identification to the first and second services supporting single sign on functionality carried out by a single sign-on service between the first and second service,
   wherein the first service and the second service store a respective first and second federation key associated with the user agent, the user agent generates a third federation key based on the pseudo-identification for signing a token generated by the single sign-on service for carrying out the single sign on functionality, and the generated third federation key is sent to the first and second service to complete the federation request.

13. The computer program product of claim 12, further comprising computer readable program code configured to associate the federation key and the pseudo-identification with user information stored by the first and second services.

14. The computer program product of claim 12, further comprising computer readable program code configured to maintain an association registry at each of the first and second services, each association registry storing association information.

15. The computer program product of claim 12, further comprising computer readable program code configured to revoke identity federation.

16. The computer program product of claim 15, further comprising:

computer readable program code configured to communicate the federation key to the first and second service with a revocation request; and computer readable program code configured to remove federation information of the user agent stored by the first and second services corresponding to the federation key.

17. A method for signing on to two services using a single sign-on, comprising:

logging on to a first service containing a first federation key associated with a user, using a user agent of the user, while the user agent is not logged on to a second service containing a second federation key associated with the user;

transferring a service request from the first service to the second service, the service request including the first federation key;

transferring the service request from the second service to the user agent, the second service adding the second federation key to the service request;

authenticating, at the user agent, the service request by verifying the first and second federation keys within the service request; and when the service request is authenticated by the user agent, transferring a third federation key associated with the user to each of the first and second services for authenticating the first service with the second service and the second service with the first service.

* * * * *